(12) United States Patent
Wong et al.

(10) Patent No.: US 8,654,467 B1
(45) Date of Patent: Feb. 18, 2014

(54) DISK DRIVE INCREASING BANDWIDTH OF CUTOFF FILTER WHILE READING SERVO SECTOR PREAMBLE

(75) Inventors: Wai Ee Wong, Singapore (SG); Xiaotian Xu, Singapore (SG); Jinchuan Zheng, Melbourne (AU); Guoxiao Guo, Irvine, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 4 days.

(21) Appl. No.: 13/448,023

(22) Filed: Apr. 16, 2012

(51) Int. Cl.
*G11B 27/36* (2006.01)

(52) U.S. Cl.
USPC ............... 360/31; 360/30; 360/43; 360/61; 360/75

(58) Field of Classification Search
None
See application file for complete search history.

(56) References Cited

U.S. PATENT DOCUMENTS

| | | | |
|---|---|---|---|
| 5,777,760 A | 7/1998 | Hays et al. | |
| 5,903,857 A | 5/1999 | Behrens et al. | |
| 6,927,932 B1 | 8/2005 | Schell et al. | |
| 7,173,415 B1 | 2/2007 | Duan et al. | |
| 7,199,956 B1 | 4/2007 | Moser et al. | |
| 7,271,753 B1 | 9/2007 | Padukone et al. | |
| 2005/0105205 A1* | 5/2005 | Suzuki | 360/75 |
| 2005/0244167 A1 | 11/2005 | Liew et al. | |
| 2006/0109585 A1* | 5/2006 | Lee et al. | 360/77.02 |
| 2007/0024276 A1 | 2/2007 | Duan et al. | |

OTHER PUBLICATIONS

Ztec Instruments, Inc., "Oscilloscope Measurement Fundamentals," 2012, http://www.ztecinstruments.com/applications/oscilloscope-measurement-fundamentals.php.
Wikipedia, "Signal-to-noise ratio," http://en.wikipedia.org/wiki/Signal-to-noise_ratio. (Downloaded on or before Apr. 10, 2012).

* cited by examiner

*Primary Examiner* — Muhammad N Edun

(57) ABSTRACT

A disk drive is disclosed comprising a disk including a plurality of servo tracks defined by servo sectors, wherein each servo sector comprises a servo preamble. A head is actuated over the disk, wherein the head is operable to generate a read signal. The disk drive further comprises control circuitry including an analog cutoff filter operable to filter the read signal to generate a filtered read signal. The filtered read signal is sampled to generate read samples. During a normal operating mode, the analog cutoff filter is configured to have a first bandwidth. During a measurement mode, the analog cutoff filter is configured to have a second bandwidth greater than the first bandwidth, and the read samples representing at least part of the servo preamble are processed to measure a signal-to-noise ratio (SNR) and/or a fly height of the head.

20 Claims, 8 Drawing Sheets

$$\text{RMS SNR} = 20 \log_{10}\left[\frac{\sigma\, \text{ref\_wave}}{\sigma(\text{waveform} - \text{ref\_wave})}\right]$$

DISK DRIVE INCREASING BANDWIDTH OF CUTOFF FILTER WHILE READING SERVO SECTOR PREAMBLE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 2 as comprising a number of servo tracks 6 defined by servo sectors $4_0$-$4_N$ recorded around the circumference of each servo track. Each servo sector 4, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 4, further comprises groups of servo bursts 14 (A,B,C,D in the example shown), which are recorded with precise intervals and offsets relative to the track centerlines. The servo bursts 14 provide fine head position information used for centerline tracking while accessing a data track during write/read operations.

DETAILED DESCRIPTION

Figure 2A:
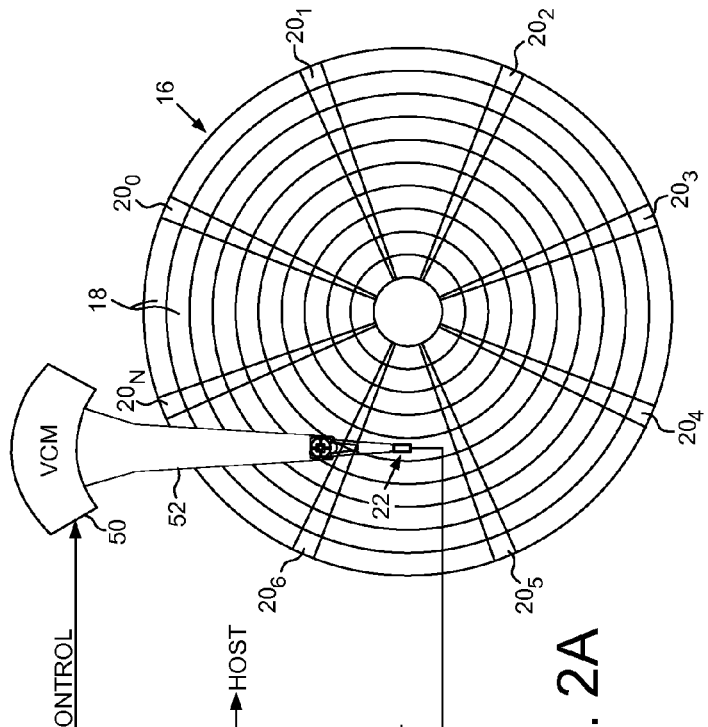
FIG. 2A shows a disk drive according to an embodiment of the present invention comprising a head actuated over a disk, and control circuitry.
Figure 2B:
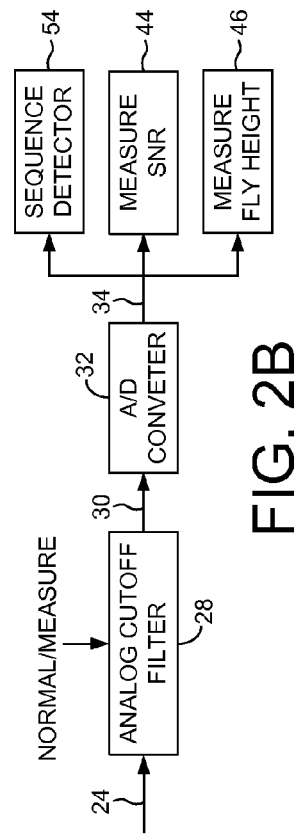
FIG. 2B shows control circuitry according to an embodiment of the present invention comprising an analog cutoff filter.
Figure 2C:
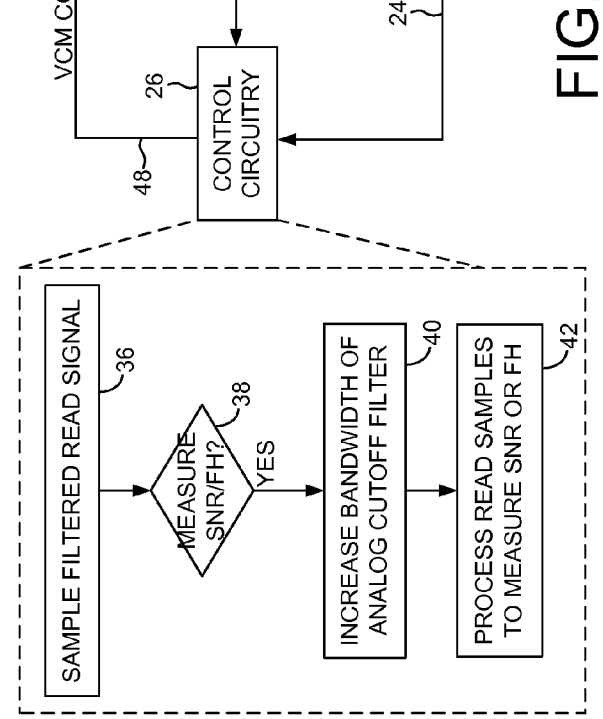
FIG. 2C is a flow diagram according to an embodiment of the present invention wherein when making a signal-to-noise (SNR) measurement of a servo sector or when making a fly height measurement, a bandwidth of the analog cutoff filter is increased.

FIG. 2A shows a disk drive according to an embodiment of the present invention comprising a disk 16 including a plurality of servo tracks 18 defined by servo sectors $20_0$-$20_N$, wherein each servo sector 20, comprises a servo preamble. A head 22 is actuated over the disk 16, wherein the head 22 is operable to generate a read signal 24. The disk drive further comprises control circuitry 26 including an analog cutoff filter 28 (FIG. 2B) operable to filter the read signal 24 to generate a filtered read signal 30. The control circuitry 26 is operable to execute the flow diagram of FIG. 2C, wherein the filtered read signal 30 is sampled at an analog-to-digital (A/D) converter 32 to generate read samples 34 (block 36). During a normal operating mode, the analog cutoff filter 28 is configured to have a first bandwidth. During a measurement mode (block 38), the analog cutoff filter 28 is configured to have a second bandwidth greater than the first bandwidth (block 40), and the read samples 34 representing at least part of the servo preamble are processed 44 to measure a signal-to-noise ratio (SNR) or processed 46 to measure a fly height (FH) of the head (block 42).

In the embodiment of FIG. 2A, the control circuitry 26 processes the read signal 24 emanating from the head 22 to demodulate the servo sectors $20_0$-$20_N$ on the disk 16 and generate a position error signal (PES) representing an error between the actual position of the head and a target position relative to a target track. The control circuitry 26 filters the PES using suitable compensation filters to generate a control signal 48 applied to a voice coil motor (VCM) 50 which rotates an actuator arm 52 about a pivot, thereby actuating the head 22 radially over the disk 16 in a direction that reduces the PES. The actual position of the head is measured by reading position information derived from the servo sectors $20_0$-$20_N$, such as a track address for coarse positioning and servo bursts for fine positioning. The servo bursts may comprise any suitable pattern, such as an amplitude based servo pattern as shown in FIG. 1, or a suitable phase based servo pattern.

When reading one of the servo sectors 20, during normal operation, the control circuitry 26 configures the analog cutoff filter 28 to have the first bandwidth, wherein in one embodiment the first bandwidth corresponds to a suitable partial response (PR). In this embodiment a suitable sequence detector 54 (e.g., a suitable Viterbi detector) process the read samples 34 (after digital equalization not shown) in order to detect the sync mark 10 and servo data 12 in the servo sector $20_i$. It may be desirable to measure the SNR of a servo sector as part of a qualification procedure, or defect mapping procedure. It may also be desirable to measure a fly height of the head 22 when reading a servo preamble. However, when attempting to measure the SNR of the servo sector or measure the fly height of the head, the first bandwidth of the analog cutoff filter 28 may attenuate higher frequencies in the analog read signal 24 that may provide a more accurate SNR or fly height measurement. Accordingly, in one embodiment during a measurement mode the control circuitry 26 increases the bandwidth of the analog cutoff filter 28 while reading at least part of a servo preamble in order to improve the accuracy of the SNR or fly height measurement.

Figure 1:
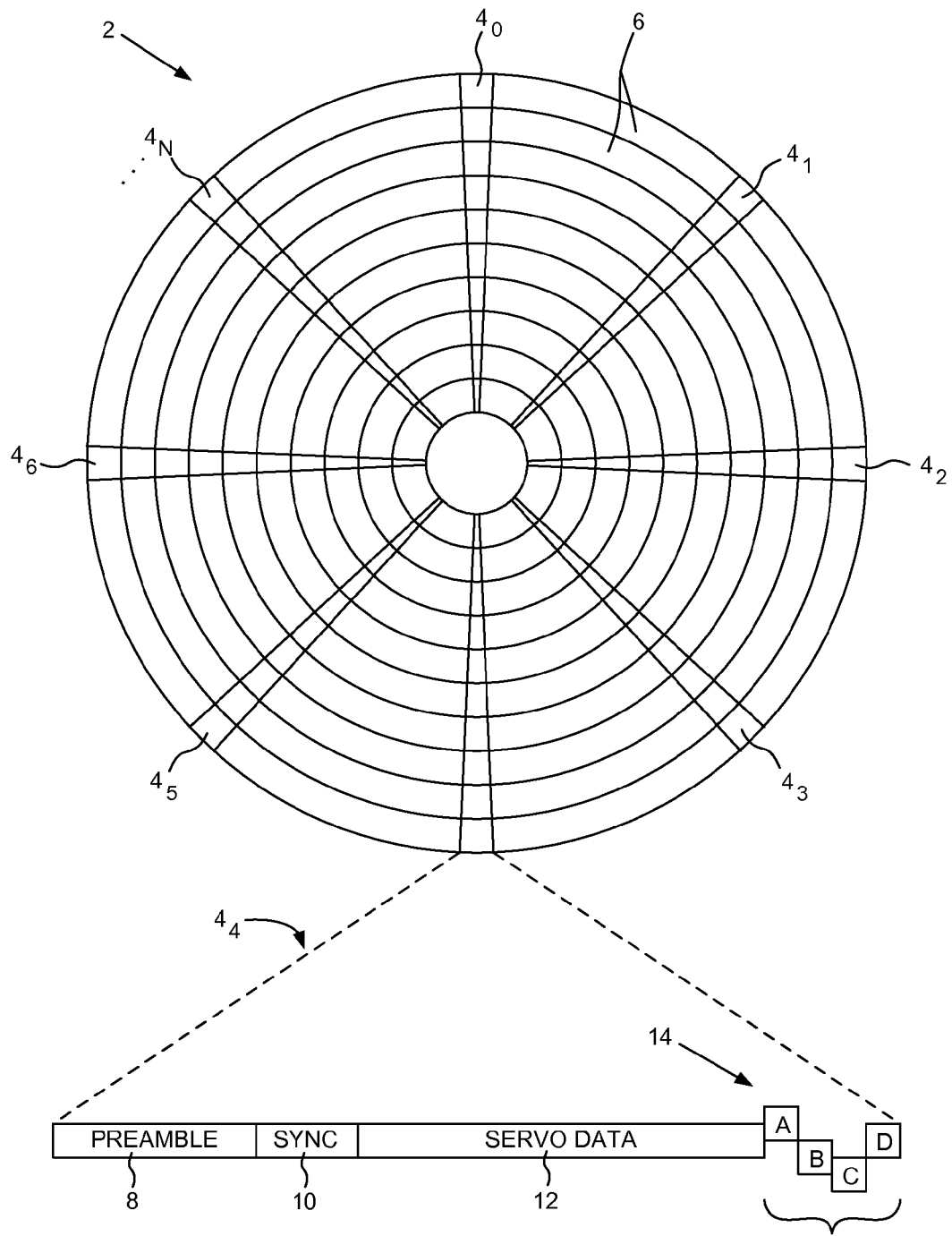
FIG. 1 shows a prior art disk format comprising a plurality of servo tracks defined by embedded servo sectors.

The servo preamble used for SNR or fly height measurement may comprise the preamble 8 preceding the sync mark 10 as shown in FIG. 1. In another embodiment, each servo sector may comprise a separate servo preamble (e.g., recorded before or after the servo bursts), wherein the separate servo preamble may be recorded at the same or different frequency as the preamble 8 preceding the sync mark 10.

Figure 3A:
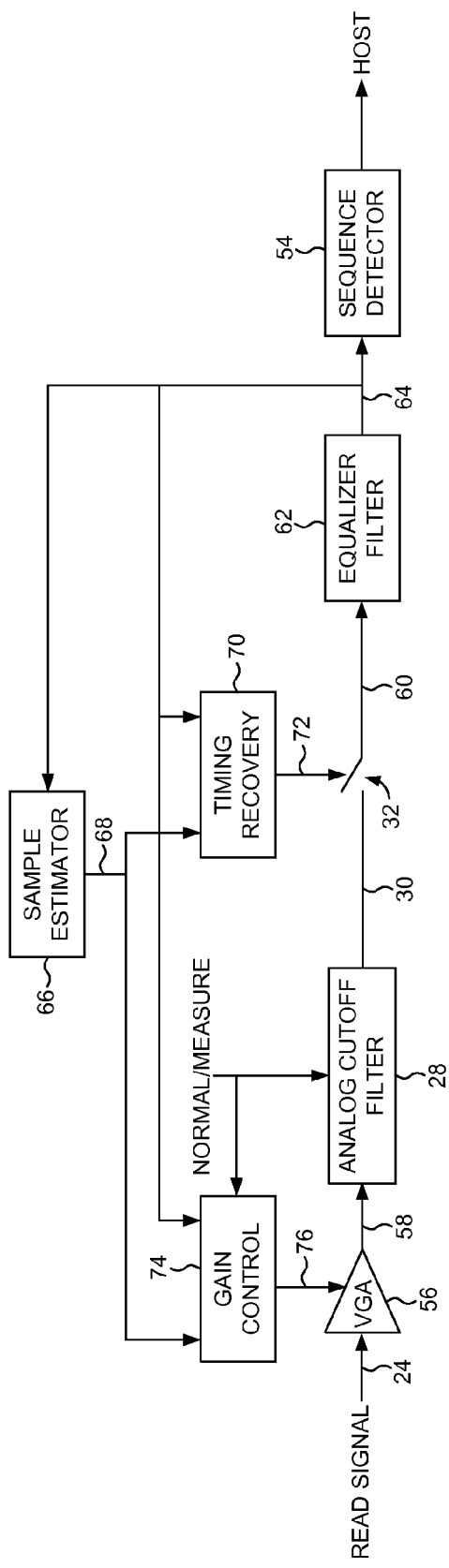
FIG. 3A shows control circuitry according to an embodiment of the present invention comprising a timing control loop and a gain control loop.

FIG. 3A shows control circuitry (part of control circuitry 26 of FIG. 2A) according to an embodiment of the present invention, including a variable gain amplifier (VGA) 56 for amplifying the read signal 24. The control circuitry further comprises a sampling device 32 for sampling the filtered read signal 30 to generate a sequence of read signal sample values 60. An equalizing filter 62 shapes the read signal sample values 60 according to a desired response (e.g., a partial response or PR) to generate equalized sample values 64. The equalized sample values 64 are processed by a sequence detector 54 (e.g., a Viterbi detector) to detect an estimated bit sequence representing the data recorded on the disk. In one embodiment, the control circuitry further comprises a sample estimator 66 (e.g., a slicer) for estimating a target sample value 68 from an equalized sample value 64. The target sample value 68 and equalized sample value 64 are processed by timing recovery 70 to synchronize a sampling clock 72 to the baud rate of the data, and processed by gain control 74 to generate a VGA gain setting 76 for adjusting the gain of the VGA 56.

Figure 3B:
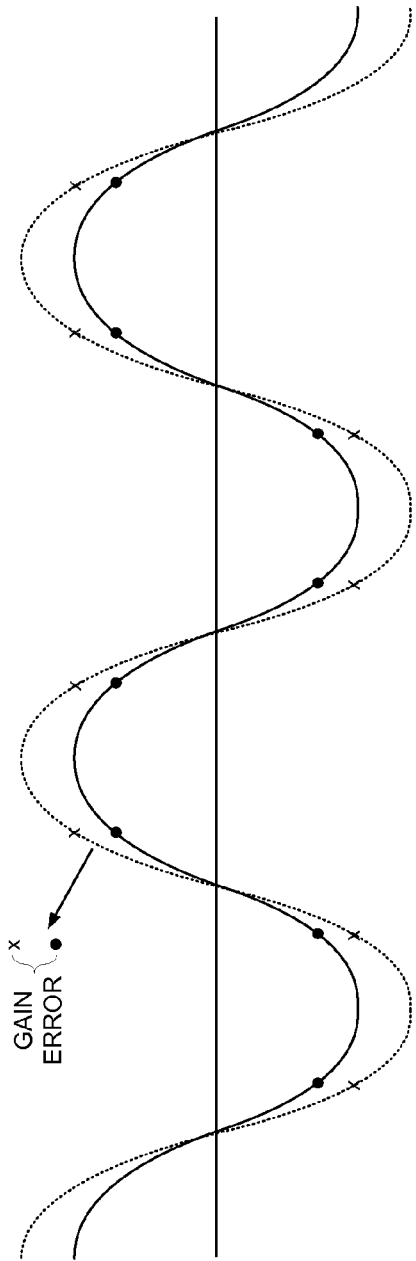
FIG. 3B shows an embodiment of the present invention for generating a gain error based on the read samples of the read signal when reading a preamble.

Operation of the gain control 74 is understood with reference to FIG. 3B which shows a substantially sinusoidal read signal generated by reading an NT pattern (e.g., a 2T servo preamble or a 4T servo preamble in a servo sector). The solid circles represent the measured amplified read signal samples, and the "x"s represent target sample values corresponding to a target amplitude of the amplified read signal. The resulting gain error is used to adjust the gain setting 76 and therefore the gain of the VGA 56. In the example of FIG. 3B, the gain error will increase the gain setting 76 so as to increase the amplitude of the amplified read signal 58 toward the target amplitude.

Figure 4:
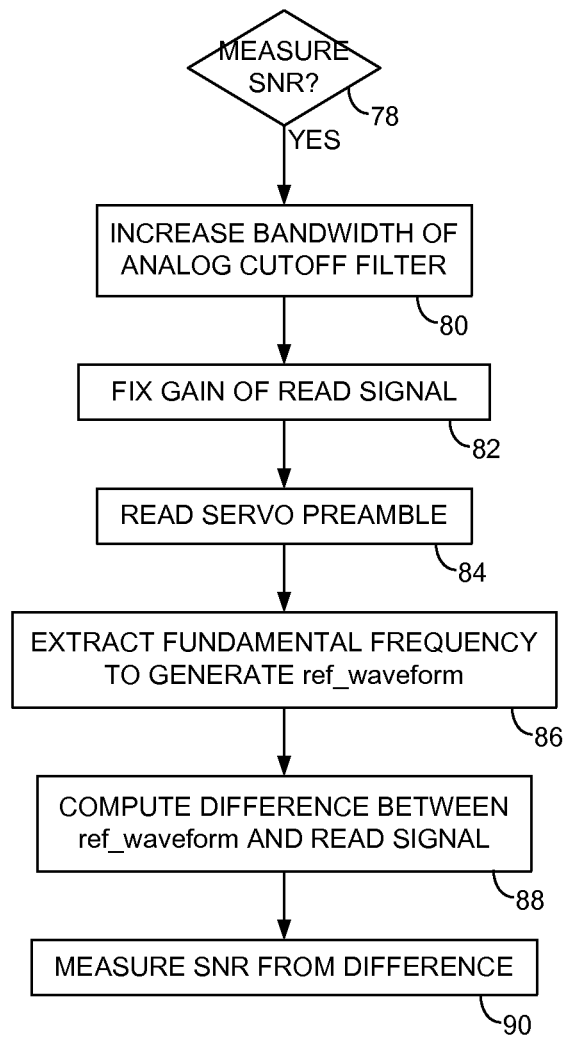
FIG. 4 is a flow diagram according to an embodiment of the present invention wherein the gain control loop is configured to fix the gain of the read signal while reading at least part of the servo preamble during the measurement mode, a reference waveform is generated by extracting a fundamental frequency from the read samples, and a noise waveform is generated by computing a difference between the reference waveform and the read samples.

FIG. 4 is a flow diagram according to an embodiment of the present invention wherein during the measurement mode (block 78) the bandwidth of the analog cutoff filter is increased (block 80) and the gain of the read signal is fixed (block 82). Fixing the gain of the read signal during the measurement mode may improve the accuracy of the SNR measurement, and/or the fly height measurement. In one embodiment, the gain of the read signal is fixed over just the servo preamble, and in another embodiment the gain of the read signal is fixed over the entire servo sector. In yet another embodiment, the gain of the read signal may be fixed over multiple consecutive servo sectors, for example, over an entire revolution of the disk.

The flow diagram of FIG. 4 also illustrates an embodiment of the present invention wherein when making a SNR measurement for a servo sector, at least part of the servo preamble is read (block 84) and a reference waveform is generated by extracting a fundamental frequency from the read samples representing at least part of the servo preamble (block 86). A noise waveform is generated by computing a difference between the reference waveform and the read samples representing at least part of the servo preamble (block 88), and the SNR is measured based on the difference (block 90). In one embodiment, the control circuitry is operable to measure the SNR according to (FIG. 8):

$$RMS\ SNR = 20\log_{10}\left[\frac{\sigma_{ref\_wave}}{\sigma(waveform - ref\_wave)}\right]$$

where:
ref_wave is the reference waveform;
waveform is the read samples representing the servo preamble;
waveform−ref_wave is the noise waveform;
$\sigma_{ref\_wave}$ is the standard deviation of the reference waveform; and
$\sigma(waveform-ref\_wave)$ is the standard deviation of the noise waveform.

The above equation provides an estimate of SNR because the servo preamble comprises a sinusoidal signal which has a zero mean.

Figure 5:
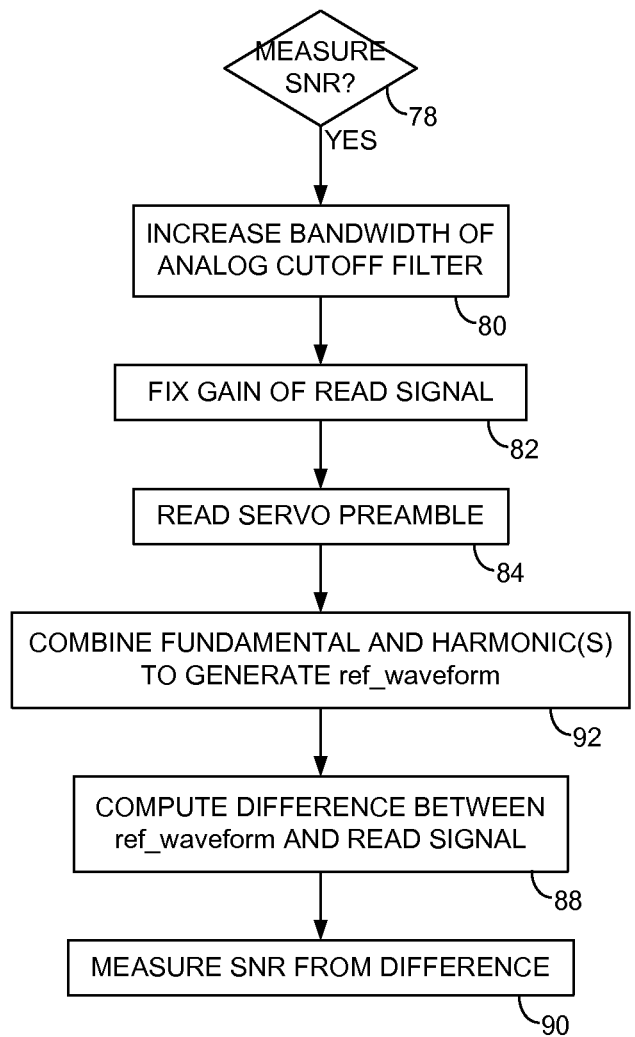
FIG. 5 is a flow diagram according to an embodiment of the present invention wherein the reference waveform is generated by combining the fundamental frequency with harmonic(s).
Figure 6:
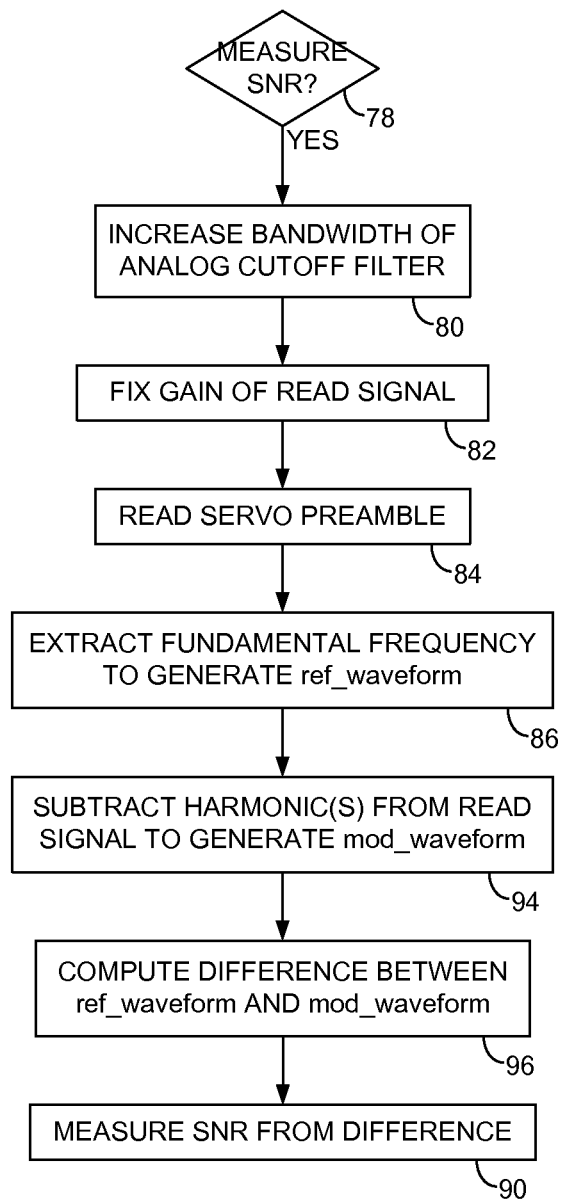
FIG. 6 is a flow diagram according to an embodiment of the present invention wherein the noise waveform is generated after subtracting the harmonic(s) from the read signal.

FIG. 5 is a flow diagram according to an embodiment of the present invention which is an extension of the flow diagram of FIG. 4, wherein the control circuitry is operable to generate the reference waveform by combining the fundamental frequency with at least one harmonic of the read samples representing at least part of the servo preamble (block 92). In this embodiment, the harmonics of the read samples representing at least part of the servo preamble comprise more signal power than noise power. In an alternative embodiment, the harmonics may comprise more noise power than signal power. Accordingly, in an embodiment shown in the flow diagram of FIG. 6 the control circuitry generates the noise waveform by subtracting from the difference (between the reference waveform and the read samples) at least one harmonic of the read samples representing at least part of the servo preamble to generate a modified waveform (block 94), and the noise waveform is generated by computing a difference between the reference waveform and the modified waveform (block 96).

Figures 7, 8:
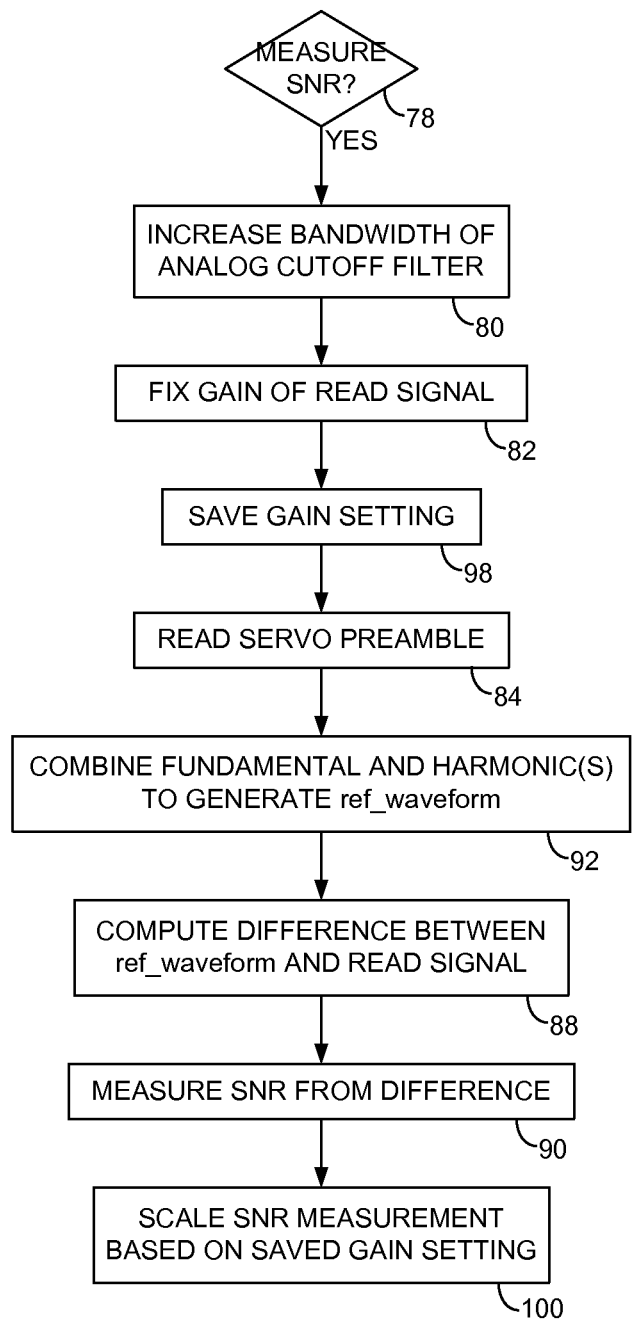
FIG. 7 is a flow diagram according to an embodiment of the present invention wherein the SNR measurement for a servo sector is scaled by the fixed gain setting.
FIG. 8 shows an equation for computing the SNR according to an embodiment of the present invention.

FIG. 7 is a flow diagram according to an embodiment of the present invention wherein after fixing the gain of the read signal (block 82), the fixed gain setting is saved (block 98). After measuring the SNR (block 90), the SNR measurement is scaled by the fixed gain setting (block 100). In this manner, the SNR measurements across different servo sectors (and optionally across multiple disk revolutions) are normalized relative to the fixed gain setting that is used to generate each SNR measurement.

Figure 9:
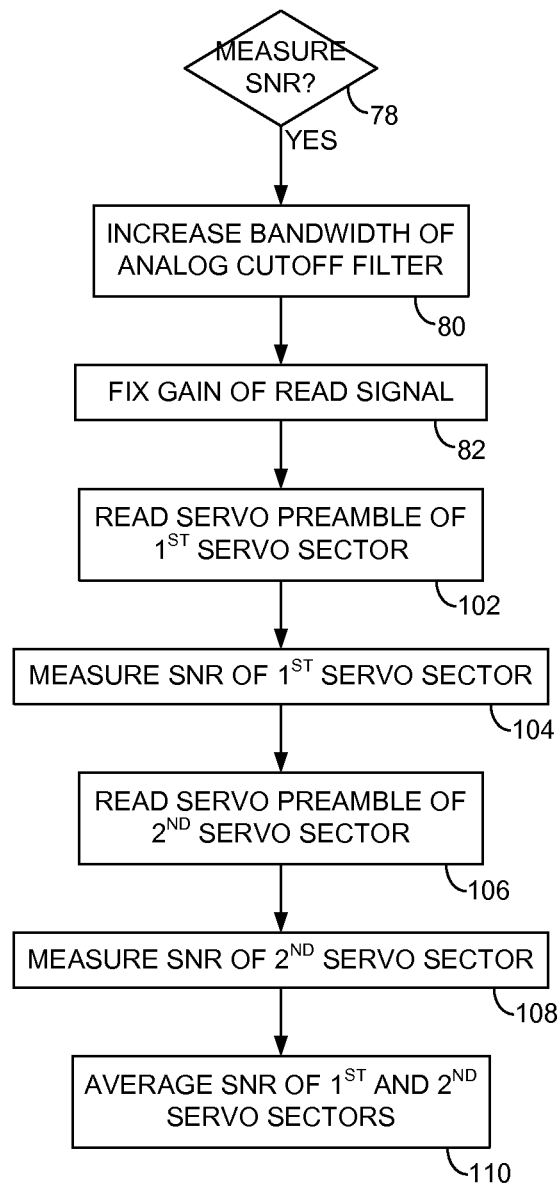
FIG. 9 is a flow diagram according to an embodiment of the present invention wherein an SNR measurement is generated for at least two consecutive servo sectors using a fixed gain setting, and then the SNR measurements are averaged.

FIG. 9 is a flow diagram according to an embodiment of the present invention wherein after fixing the gain of the read signal (block 82), at least part of the preamble of a first servo sector is read (block 102) and a corresponding first SNR is measured (block 104). When a second, consecutive servo sector is read (block 106), the same fixed gain setting is used to read at least part of the servo preamble and a corresponding second SNR is measured (block 108). The control circuitry then averages the first and second SNR measurements (block 110) in order to generate an SNR measurement for at least part of a servo track. In one embodiment, an SNR measurement is generated for each servo sector in a servo track, and then averaged to generate an SNR measurement for the entire servo track.

Referring again to FIG. 2B, in one embodiment the sampling device 32 is an analog-to-digital (A/D) converter that comprises a buffer for buffering the read samples representing at least part of the servo preamble used to measure the SNR and/or fly height. The control circuitry comprises suitable timing circuitry in order to enable the capture of the read samples at the appropriate time relative to the servo preamble, as well as extract and store the read samples buffered in the A/D converter 32 for later processing by a microprocessor to generate the desired measurement.

Any suitable algorithm may be employed to generate a fly height measurement from the read samples representing at least part of the servo preamble. In one embodiment, a harmonic ratio technique may be employed which computes the ratio of two harmonics (e.g., fundamental and third harmonic) in the read samples representing at least part of the servo preamble. In another embodiment, the fly height measurement may be generated using a Wallace spacing equation. Whatever the algorithm used to measure the fly height, increasing the bandwidth of the analog cutoff filter 28 (and optionally fixing the gain 76 of the read signal 24) may improve the accuracy of the fly height measurement.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo tracks defined by servo sectors, wherein each servo sector comprises a servo preamble;
   a head actuated over the disk, the head operable to generate a read signal; and
   control circuitry comprising an analog cutoff filter operable to filter the read signal to generate a filtered read signal, the control circuitry operable to:
   sample the filtered read signal to generate read samples;
   during a normal operating mode, configure the analog cutoff filter to have a first bandwidth; and
   during a measurement mode:
   configure the analog cutoff filter to have a second bandwidth greater than the first bandwidth; and
   process the read samples representing at least part of the servo preamble to measure a signal-to-noise ratio (SNR).

2. The disk drive as recited in claim 1, wherein the control circuitry further comprises a gain control loop, the control circuitry is further operable to:
   during the normal operating mode, configure the gain control loop to adjust the gain of the read signal relative to a target amplitude; and
   during the measurement mode, configure the gain control loop to fix the gain of the read signal.

3. The disk drive as recited in claim 2, wherein during the measurement mode the control circuitry is further operable to fix the gain of the read signal over at least two consecutive servo sectors.

4. The disk drive as recited in claim 3, wherein the control circuitry is further operable to average the SNR measured for the at least two consecutive servo sectors.

5. The disk drive as recited in claim 2, wherein the control circuitry is further operable to scale the measured SNR by the fixed gain.

6. The disk drive as recited in claim 1, wherein the control circuitry is operable to measure the SNR by:
   generating a reference waveform by extracting a fundamental frequency from the read samples representing at least part of the servo preamble; and
   generating a noise waveform by computing a difference between the reference waveform and the read samples representing at least part of the servo preamble.

7. The disk drive as recited in claim 6, wherein the control circuitry is operable to measure the SNR according to:

$$RMS\ SNR = 20\log_{10}\left[\frac{\sigma_{ref\_wave}}{\sigma(waveform - \text{ref\_wave})}\right]$$

where:
   ref_wave is the reference waveform;
   waveform is the read samples representing the servo preamble;
   waveform−ref_wave is the noise waveform;
   $\sigma_{red\_wave}$ is the standard deviation of the reference waveform; and
   σ(waveform−ref_wave) is the standard deviation of the noise waveform.

8. The disk drive as recited in claim 6, wherein the control circuitry is operable to generate the reference waveform by combining the fundamental frequency with at least one harmonic of the read samples representing at least part of the servo preamble.

9. The disk drive as recited in claim 6, wherein the control circuitry is further operable to generate the noise waveform by subtracting from the difference at least one harmonic of the read samples representing at least part of the servo preamble.

10. A disk drive comprising:
   a disk comprising a plurality of servo tracks defined by servo sectors, wherein each servo sector comprises a servo preamble;
   a head actuated over the disk, the head operable to generate a read signal; and
   control circuitry comprising an analog cutoff filter operable to filter the read signal to generate a filtered read signal, the control circuitry operable to:
   sample the filtered read signal to generate read samples;
   during a normal operating mode, configure the analog cutoff filter to have a first bandwidth; and
   during a measurement mode:
   configure the analog cutoff filter to have a second bandwidth greater than the first bandwidth; and
   process the read samples representing at least part of the servo preamble to measure a fly height of the head.

11. A method of operating a disk drive, the disk drive comprising a disk comprising a plurality of servo tracks defined by servo sectors, wherein each servo sector comprises a servo preamble, a head actuated over the disk, the head operable to generate a read signal, and control circuitry comprising an analog cutoff filter operable to filter the read signal to generate a filtered read signal, the method comprising:
   sampling the filtered read signal to generate read samples;
   during a normal operating mode, configuring the analog cutoff filter to have a first bandwidth; and
   during a measurement mode:
      configuring the analog cutoff filter to have a second bandwidth greater than the first bandwidth; and
      processing the read samples representing at least part of the servo preamble to measure a signal-to-noise ratio (SNR).

12. The method as recited in claim 11, wherein the control circuitry further comprises a gain control loop, the method further comprising:
   during the normal operating mode, configuring the gain control loop to adjust the gain of the read signal relative to a target amplitude; and
   during the measurement mode, configuring the gain control loop to fix the gain of the read signal.

13. The method as recited in claim 12, wherein during the measurement mode the method further comprising fixing the gain of the read signal over at least two consecutive servo sectors.

14. The method as recited in claim 13, further comprising averaging the SNR measured for the at least two consecutive servo sectors.

15. The method as recited in claim 12, further comprising scaling the measured SNR by the fixed gain.

16. The method as recited in claim 11, further comprising measuring the SNR by:
   generating a reference waveform by extracting a fundamental frequency from the read samples representing at least part of the servo preamble; and
   generating a noise waveform by computing a difference between the reference waveform and the read samples representing at least part of the servo preamble.

17. The method as recited in claim 16, further comprising measuring the SNR according to:

$$RMS\ SNR = 20\log_{10}\left[\frac{\sigma_{ref\_wave}}{\sigma(waveform - ref\_wave)}\right]$$

where:
   ref_wave is the reference waveform;
   waveform is the read samples representing the servo preamble;
   waveform−ref_wave is the noise waveform;
   $\sigma_{ref\_wave}$ is the standard deviation of the reference waveform; and
   σ(waveform−ref_wave) is the standard deviation of the noise waveform.

18. The method as recited in claim 16, further comprising generating the reference waveform by combining the fundamental frequency with at least one harmonic of the read samples representing at least part of the servo preamble.

19. The method as recited in claim 16, further comprising generating the noise waveform by subtracting from the difference at least one harmonic of the read samples representing at least part of the servo preamble.

20. A method of operating a disk drive, the disk drive comprising a disk comprising a plurality of servo tracks defined by servo sectors, wherein each servo sector comprises a servo preamble, a head actuated over the disk, the head operable to generate a read signal, and control circuitry comprising an analog cutoff filter operable to filter the read signal to generate a filtered read signal, the method comprising:
   sampling the filtered read signal to generate read samples;
   during a normal operating mode, configuring the analog cutoff filter to have a first bandwidth; and
   during a measurement mode mode:
      configuring the analog cutoff filter to have a second bandwidth greater than the first bandwidth; and
      processing the read samples representing at least part of the servo preamble to measure a fly height of the head.

* * * * *